United States Patent [19]

Reynolds et al.

[11] Patent Number: 4,804,249
[45] Date of Patent: Feb. 14, 1989

[54] OPTICAL FILTER FOR INCOHERENT IMAGING SYSTEMS

[75] Inventors: George O. Reynolds, Waban; Peter F. Mueller, Concord, both of Mass.

[73] Assignee: Honeywell Inc., Minneapolis, Minn.

[21] Appl. No.: 946,248

[22] Filed: Dec. 24, 1986

[51] Int. Cl.$^4$ .......................... G02B 3/10; G02B 5/18; G02B 27/00

[52] U.S. Cl. ............................... 350/437; 350/162.11; 350/163; 350/447; 350/451

[58] Field of Search ............... 350/162.11, 162.2, 163, 350/321, 437, 447, 448, 451

[56] References Cited

U.S. PATENT DOCUMENTS 2,959,105 11/1960 Sayanagi .

OTHER PUBLICATIONS

Reynolds, G. O., et al, *JOSA*, 72 (12), Dec., 1982, p. 1746.
Laurin, T., et al, eds., *The Optical Industry & Systems Directory*, 22 ed., vol. 2, Pittsfield, MA: The Optical Publishing Co., Inc. 1976, p. D-17.
Matsumura, M., "Speckle Noise Reduction by Random Phase Shifters," *Japanese Journal of Applied Physics*, vol. 13, No. 3, Mar. '74, pp. 557–558 (J102-7404-B.

*Primary Examiner*—John K. Corbin
*Assistant Examiner*—David J. Edmondson
*Attorney, Agent, or Firm*—Haugen and Nikolai

[57] ABSTRACT

An optical filter for use with an imaging lens in an incoherent imaging system operating in broadband illumination for increasing the depth-of-focus of the lens while maintaining energy thru-put is disclosed. The optical filter comprises a transparent support having on one surface thereof an array of transparent, discrete steps of substantially equal size, each step having a thickness that differs from all other steps by at least the coherence length of the radiation to be passed and the size of the array being equal to the size of the lens. In use, the optical filter is positioned in front of the imaging lens. When so positioned, the depth of focus of the imaging lens is proportional to the size of the individual steps rather than the size of the lens while the energy thru-put of the imaging remains the same as it would be without the optical filter.

5 Claims, 1 Drawing Sheet

OPTICAL FILTER FOR INCOHERENT IMAGING SYSTEMS

BACKGROUND OF THE INVENTION

The present invention relates generally to optical filters and more particularly to an optical filter for use with an imaging lens in an incoherent imaging system for increasing the depth of focus of the imaging lens while maintaining energy thru-put. The invention is especially useful with but not exclusively limited to use with incoherent imaging systems involving phase conjugation for use in correcting window aberrations in aircraft, missiles or other sensor platforms.

The aerodynamic performance requirements for aircraft, missiles or other sensor platforms often necessitate the use of conformal windows that have curved surfaces which are not symmetrical. In addition, these windows often exhibit localized manufacturing errors, such as thickness and curvature variations as well as prismatic or wedge effects. These imperfections and asymmetries result in complex distortions of a scene when it is viewed through such windows. Some of the distortions may be characterized as follows: (1) localized or global shape distortions, (2) variable or localized magnification caused by the variations in optical power of the window, (3) one-dimensional magnifications and shifts caused by unequal curvatures of the window in different directions, and (4) other distortions caused by geometrical and/or surface defects on the outside surface of the window, the inside surface of the window or both the outside and inside surfaces of the window.

Sometimes the distortion caused by these irregularities is so severe that no recognizeable image can be obtained.

Therefore, errors of this magnitude may be devastating to the performance of an imaging sensor which may be placed behind the window. Similarly, these errors may significantly effect the judgement of a pilot viewing a scene through the window or sensor image because of binocular deviations or disparity. Because of these distortions, the design of windows on such vehicles, especially on high speed platforms used in conjunction with imaging sensors has, unfortunately, often been controlled primarily by the sensor imaging requirements, rather than by the aerodynamic requirements. In other instances the problem of image distortion caused by window aberrations has been avoided by simply eliminating the window element itself and viewing the scene to be observed through a hole in the aircraft or by using a flat window. Both of these solutions compromise the performance of the vehicle.

The process of phase conjugation, which results from multiplying a complex wavefront by its complex conjugate is a well-known technique for correcting wavefront distortion. Phase conjugation techniques using conjugate refractive (or reflective) type elements have also been used in a variety of circumstances to correct wavefront distortion. For example, in non-linear optics, a non-linear medium is used in conjunction with four-wave laser mixing to create real-time phase conjugated (corrected) wavefronts. Conjugate wavefronts have also been used to dynamically remove the effects of atmospheric turbulence from telescopes and other optical systems. In this type of application, referred to as "adaptive optics", interferometric measurements and appropriate servo-loops are used to drive flexible optical elements to dynamically realize phase conjugations, and thus wavefront correction.

A talk pertaining to broadband phase conjugation using thin flat plate aberrators and entitled Phase Conjugation With Incoherent Radiation was presented by G. O. Reynolds, D. A. Servaes and J. B. DeVelis on Oct. 19, 1982 at the 1982 annual meeting of the Optical Society of America and is summarized on page 1746 of the Journal of Optical Society of America, December, 1982, Volume 72. A talk entitled, "Phase Conjugation with Partially Coherent Radiation," was presented by D. A. Servaes, J. B. DeVelis and G. O. Reynolds, at the Optical Computing Conference, M.I.T. Boston, MA, on Apr. 7, 1983. In both of the above talks it was shown that a thin, flat glass plate randomly scratched on one side could be passively phase conjugated for use with white light (i.e. broadband radiation) by placing a nearly index matched plastic replica of that plate in the image plane of the plate formed by an imaging lens, thereby creating a substantially undistorted image of a target when viewed through the lens by another imaging system.

Recently, it has been suggested that broadband phase conjugation be used to correct complex phase aberrations in aerodynamic windows or other types of "thick" aberrators (i.e. transparent elements more than about a few millimeters thick). A system for accomplishing this could comprise a conjugate element which would preferably be made of optical quality material and an imaging lens. The imaging lens would be positioned between the window and the conjugate element at the appropriate distance from the window and the conjugate element so as to image the window onto the conjugate element.

One of the limitations of the above described system when used for such an application is that the depth-of-focus of the imaging lens that would typically be used for imaging the window onto the conjugate element would in most cases, not be as large as the maximum change in the thickness of the window over its entire area. As a result, only those portions of the window whose thickness changes fall within the depth-of-focus of the lens would be brought to focus on the conjugate element and corrected. Thus, the entire area of the window would, in effect not be corrected and thus not be useable.

As is known, the depth-of-focus of a lens is a finite value. This value is equal approximately to twice the mean wavelength of the light being transmitted through the lens multiplied the square of the F number of the lens. Thus, for a lens having an F number of 1 and being used with visible light, the depth-of-focus is about one micron. As is also known, the F number of a lens is equal to its focal length divided by its aperture diameter. As can thus be appreciated, if the wavelength (or wavelength band) of the light being transmitted remains fixed, the depth-of-focus of a lens can be increased by either increasing its focal length or by decreasing its aperture diameter or by changing both the focal length and the aperture diameter as appropriate. Unfortunately, increasing the focal length is not a practical way of increasing the depth-of-focus of an imaging lens when the lens is being used in an imaging system since such a change would cause an increase in the overall area occupied by the system. As can be appreciated, any change of this kind is very undesirable. On the other hand, decreasing the aperture size of the lens is also not a practical solution since this would decrease the amount of light that would be collected by the lens and in most instances a reduction in light collection capability is also very undesirable.

In U.S. Pat. No. 2,959,105 to K. Sayanagi there is disclosed an optical filter for use with an imaging lens. The optical filter comprises a support which is made of transparent material and includes a plurality of discrete mutually spaced spots of transparent film on one surface. The spots are formed by evaporation or other suitable means. Each spot is of a thickness of the order of the wavelength of the light passing through the filter and lens, is a desired shape and is of a material of a predetermined density. The spots of the plurality have a random distribution on the support and the ratio of the area of the transparent support covered by the spots to the portion of support area free of spots is unity. The thickness of the spots is such that the length of the transmission path of light through the spot-covered regions of the support is a half wavelength of the light longer than through the support free of spots.

It is an object of this invention to provide an optical filter for use in increasing the depth-of-focus of an imaging lens operating in broadband illumination while maintaining energy thru-put.

It is another object of this invention to provide an optical filter as described above which lowers the modulation transfer function of the imaging lens with which it is used.

It is still another object of this invention to provide an optical filter which is useful for eliminating aliasing in sampled imaging systems.

SUMMARY OF THE INVENTION

An optical filter constructed according to the teachings of the present invention for use with an imaging lens in an incoherent imaging system comprises a transparent support having an array of transparent, discrete, substantially equally sized steps on one surface. Each step has a thickness that differs from all other steps by an amount greater than the coherence length of the radiation being transmitted. The area and shape of the array are equal to the area and shape of the lens with which it is being used so that all light collected by the lens will first pass through the optical filter and the area of a step is equal to the area of an aperture which if placed in front of the lens would give the desired depth-of-focus. Thus, the depth-of-focus of the lens when combined with the filter is proportional to the area of a single step in the optical filter rather than the area of the lens itself while the amount of light collected by the lens is equal to the light passed into the lens through the entire array and not simply the light passed through one of the steps. Since the area of the array is equal to the area of the lens, the amount of light collected by the lens is determined by the area of the lens and the amount of light passed by the filter, it being understood that the term "light" as used herein embodies all forms of radiation.

Various objects, features and advantages will appear from the description to follow. In the description, reference is made to the accompanying drawings which form a part thereof, and in which is shown by way of illustration a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

For illustrative purposes, the optical filter of this invention will hereinafter be described by way of example for use with an imaging lens in a phase conjugating imaging system operating with incoherent radiation for removing aberrations in a window on an aircraft. It should be understood, however, that the invention is not limited only to phase conjugating imaging systems or systems for removing aberrations in aircraft and in other embodiments but rather is applicable for use with an imaging lens which is a part of any system operating with incoherent radiation.

Figure 1:
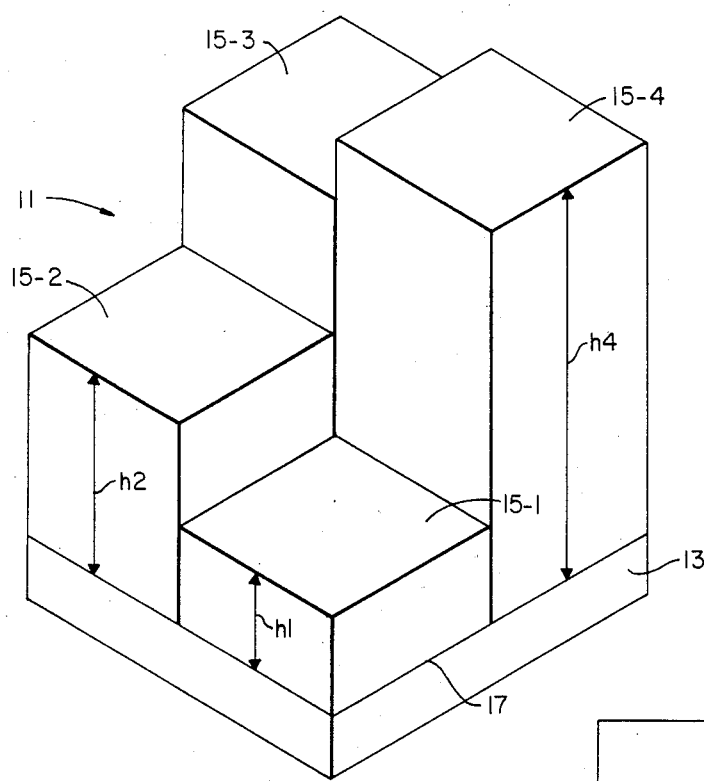
FIG. 1 is a perspective view of an optical filter constructed according to the teachings of the present invention.
Figure 2:
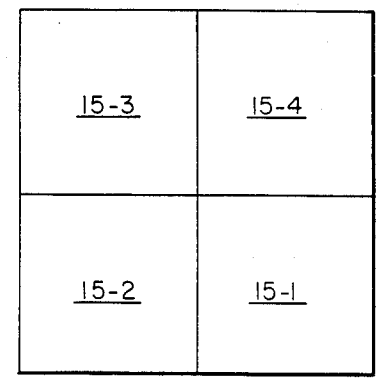
FIG. 2 is a plan view of the optical filter shown in FIG. 1.

Referring now to the drawings, there is shown in FIGS. 1 and 2 in perspective and plan view, respectively, an optical filter constructed according to the teachings of the present invention and identified generally by reference numeral 11.

Filter 11 includes a support 13 which is made of transparent material (i.e. a material that is transparent to the wavelengths of the radiation light being transmitted. For visible light, support 13 could be, for example, glass or plastic. An array of substantially equally sized steps 15-1 through 15-4 of transparent material extend upward from one surface 17 of support 13, the number of steps shown being for illustrative purposes only and the actual number in the array depending on parameters as will hereinafter be described. Steps 15-1 through 15-4 may be deposited or evaporated on support 13 or may be integrally formed on support 13.

The height (i.e. thickness) of each step 15 in the array (i.e. the height h1 of step 15-1, h2 of step 15-2, etc.) differs from the height of every other step 15 in the array by an amount that is greater than the coherence length of the radiation being transmitted through the filter 11. In this way the radiation passing through each step 15 will behave independently from the radiation passing through every other step. As is known, the coherence length of radiation may be represented by the formula:

$$l = c/v$$

where:
l = the coherence length
c = the velocity of radiation, and
v = the bandwidth of the radiation The overall area of the array and the shape of the array (i.e. circular, square, hexagonal, etc.) are equal to the overall area and shape, respectively, of the lens with which filter 11 is to be used so that all light reaching the lens is passed first through filter 11.

The overall area of support 11 is at least as large as the area of the array that is on the support.

The size (cross-sectional area) of each one of the individual steps 15 depends on the actual F number of the lens with which optical filter 11 is to be used and the depth-of-focus one wishes to obtain for the lens by using filter 11 in combination with the lens. The depth-of-focus that is needed for the lens is, as noted before, dependent on the thickness variations in the object to be imaged by the lens.

The depth-of-focus may be represented by the formula:

$$DOF = \pm \lambda (F \text{ number})^2$$

where:
DOF = the depth-of-focus $\lambda$ = mean of wavelength of radiation transmitted, and
F number = the F number of the lens.

The F number of a lens may be represented by the formula:

$$F\# = fl/d$$

where
fl = the focal length,
F# = the F number, and
d = the diameter of the lens (or lens aperture).

The size (cross sectional area) of each one of the steps 15 is equal to the size of an aperture or stop which if placed in front of the lens would produce the desired depth-of-focus. By using the formula: $DOF = \pm \lambda (F \text{ number})^2$ one can calculate the F number that would be needed and then by using the formula:

$$F\# = fl/d$$

and keeping the focal length constant one can calculate the diameter and hence the aperture size that would be needed. The area of the aperture that would be needed to give the desired depth-of-focus is the area (size) of the individual steps 15.

Steps 15 may be any suitable shape such as, for example, square, hexagonal or circular.

The number of steps 15 in the array depends on the area of the array and on the area of the individual steps. The number may be calculated by the formula:

$$A = As \times Ns$$

where:
A = the area of the array,
As = the area of a step, and
Ns = the number of steps in the array For example, an f/1 lens has a depth-of-focus of about one micron when used with visible light. Since the depth-of-focus is equal to two times the median wavelength times the square of the F number, the depth-of-focus can be increased by a factor of 9 by reducing the aperture diameter by a factor of 3. The area of the reduced aperture is equal to the size of the individual steps and the number of steps needed is equal to the number necessary to cover the entire lens.

In use, filter 11 is placed in front of the lens.

As can be appreciated, the bundle of light passing through each step from a point will be imaged by the lens at about the same point; however, the light bundle from each step will have a larger point spread function.

Figure 3:
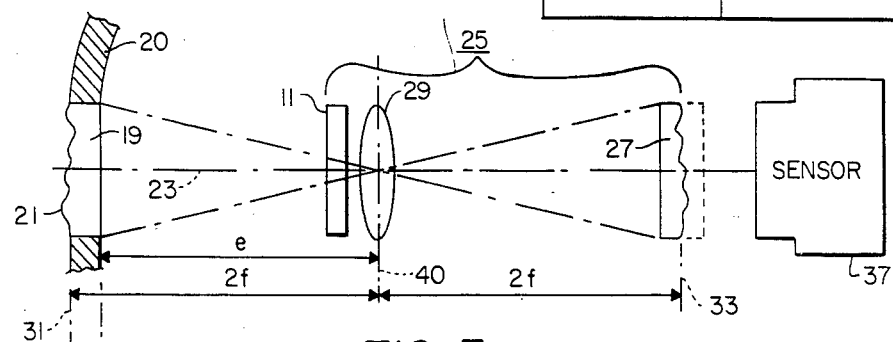
FIG. 3 is a diagram of a window mounted in the frame of an aircraft along with a conjugate imaging system for removing aberrations in the window, the conjugate imaging system including an optical filter constructed according to the present invention. Also shown is a sensor disposed inside the aircraft for imaging a scene outside the aircraft through the window.

Referring now to FIG. 3 there is shown a window 19 mounted on the frame 20 of an aircraft or other appropriate platform. Window 19 includes an outside surface 21 having irregularities producing complex phase aberrations which are to be corrected and an inside surface 23 which is considered flat for illustrative purposes and will be considered as having no geometrical and/or surface defects. For illustrative purposes, the irregularities in surface 21 causing the complex phase aberrations are greatly enlarged. Window 11 is made of optical quality material.

The phase aberrations in surface 21 are corrected using a phase conjugation imaging system 25. Phase conjugate imaging system 25 includes a conjugate element 27, an imaging lens 29 and an optical filter 11. Conjugate element 27 is made of optical quality material, has about the same index of refraction as window 11 and is made by molding or machining. Lens 29 has a depth-of-focus for the light being transmitted which is less than the maximum window thickness. Lens 29, which is located at plane 40, is positioned at a distance 2f from plane 31, the plane in which the outside surface 21 of window 11 is disposed and at a distance 2f from plane 33, the plane in which the corrective surface 35 of conjugate element 27 is located. Optical filter 11 is used to increase the depth of focus of imaging lens 29 to a value such that the entire outside surface 21 of window 19 is brought to focus about plane 33. Thus, window 19 is imaged onto conjugate element 27 with the aberrated surface 21 of window 19 and phase conjugate surface 33 of conjugate element 27 mating so as to form a clear window. Also shown in FIG. 3 is a sensor 37, such as an ultraviolet, visible or infrared camera, which is positioned for recording a scene outside of the aircraft through window 19.

The embodiment of the present invention described above is intended to be merely exemplary and those skilled in the art shall be able to make numerous variations and modifications without departing from the spirit of the present invention. All such variations and modifications are intended to be within the scope of the present invention as defined in the appended claims.

What is claimed is:

1. An optical filter for increasing the depth-of-focus of an imaging lens operating in an incoherent imaging system while maintaining energy thru-put, said optical filter comprising a transparent support having on one surface thereof an array of discrete transparent steps of substantially equal cross-sectional area, each step having a thickness that differs from all other steps by at least the coherence length of the radiation transmitted through the imaging lens.

2. The optical filter of claim 1 and wherein the overall area of the array is about equal to the area of the imaging lens.

3. The optical filter of claim 2 and wherein the area of a step is equal to the area of an aperture which if positioned in front of the imaging lens would provide a desired depth-of-focus for said imaging lens.

4. An incoherent imaging system comprising:
   a. a lens, and
   b. an optical filter in front of the lens for increasing the depth-of-focus of the lens, said optical filter comprising a transparent support having on one surface thereof an array of discrete transparent steps of equal cross-sectional area, each step having a thickness that differs from all other steps by at least the coherence length of the radiation transmitted through the imaging lens.

5. An optical filter for bandlimiting the spatial frequency of an imaging lens operating with incoherent radiation while maintaining energy thru-put, said optical filter comprising a transparent support having on one surface thereof an array of discrete transparent steps of substantially equal cross-sectional area, each step having a thickness that differs from all other steps by at least the coherence length of the radiation transmitted through the imaging lens.

* * * * *